INVENTOR
R. E. MYER
BY Walter M. Hill
ATTORNEY

United States Patent Office 3,386,046
Patented May 28, 1968

3,386,046

AUTOMATIC GAIN CONTROL CIRCUIT

Robert E. Myer, Denville, N.J., assignor to Bell Telephone Laboratories, Incorporated, New York, N.Y., a corporation of New York Filed Oct. 14, 1965, Ser. No. 495,944
8 Claims. (Cl. 330—29)

ABSTRACT OF THE DISCLOSURE

An automatic gain control circuit which converts an amplitude variable signal into a time variable signal where it is automatically regulated in amplitude by simple limiting or clipping techniques under control of the circuit output. The circuit output is obtained by integrating the amplitude regulated time variable signal to restore it to an amplitude variable signal of controlled level.

This invention relates to automatic gain control circuits for alternating current amplifiers and more particularly to such circuits capable of rapid action for use in audio systems.

Many types of audio systems require some means of maintaining a clearly audible level of output power for wide variations of input level. Public address systems, communications systems, recording systems and broadcasting systems are examples of such audio systems and in all of these systems it is necessary to control volume levels to prevent overload and distortion as well as to maintain a good signal-to-noise ratio. Most devices presently being used to perform this task are either slow acting or they cause notable distortion.

It is an object of this invention to automatically and rapidly control the gain of an amplifier without the introduction of noticeable distortion.

The foregoing object is achieved by this invention in which the signal information is converted from an amplitude variable signal to a time variable signal. The amplitude is then regulated in the time domain by simple clipping or limiting techniques. The amplitude variable signals are restored by integrating the regulated time variable signals. The amplitude of the restored signals is used to regulate the time variable signals which results in regulation of the restored signal amplitude. The invention may be better understood by reference to the accompanying drawings, in which:

FIG. 1 is a block diagram illustrating an embodiment of the invention;

FIG. 2 discloses detailed circuits of one practical embodiment of the invention;

Figure 1:
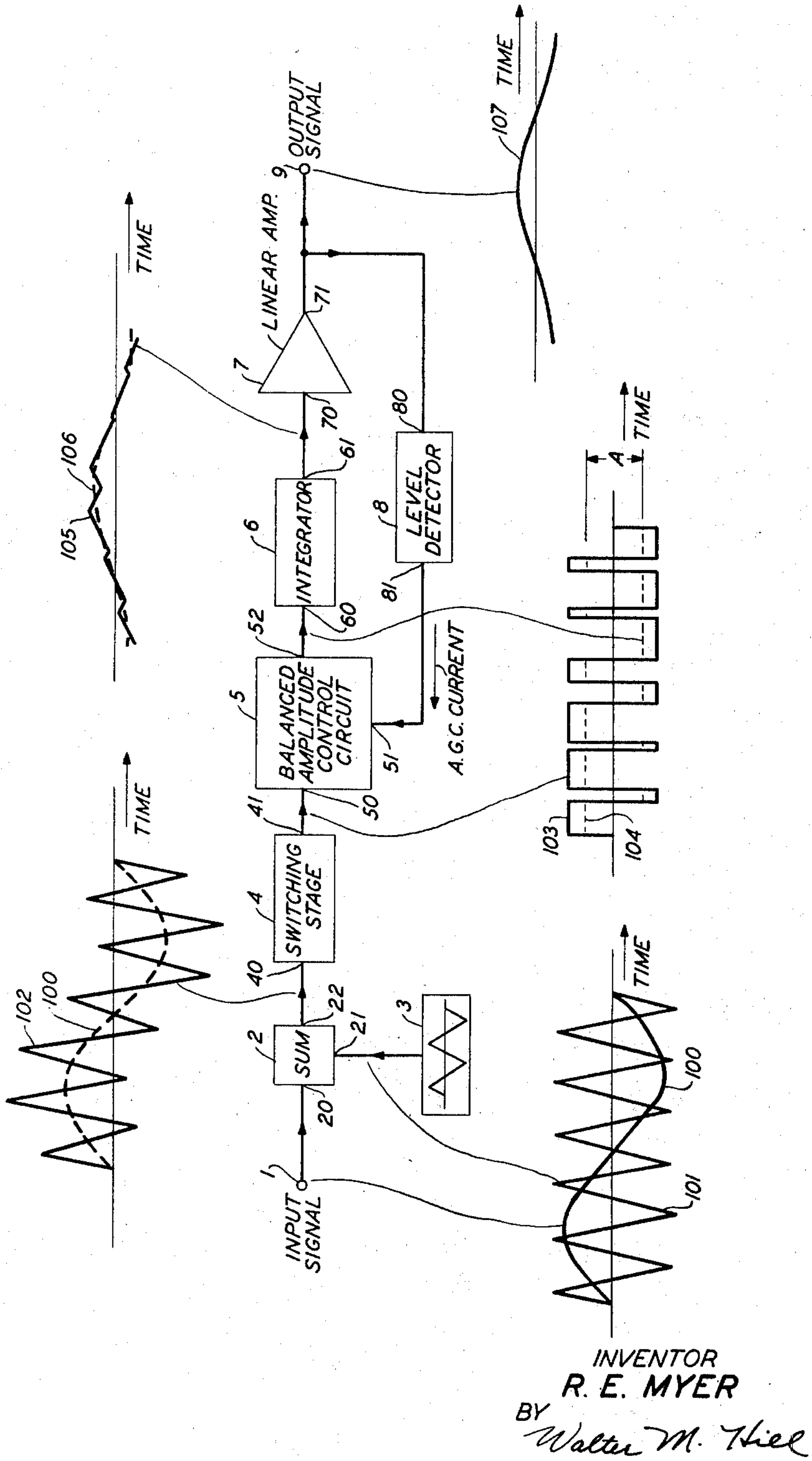

The block diagram shown in FIG. 1 discloses an organization of the essential elements for one embodiment of the invention in which the conversion of the amplitude variable signal to a time variable signal is accomplished by a summing circuit and a switching stage. To illustrate the invention it is assumed that an input signal 100 of sine wave form is applied to the input terminal 1. This signal is then applied to the signal input terminal 20 of a summing circuit 2 where it is added to a higher frequency triangular wave 101 generated by a triangular wave generator 3, the output of which is applied to the summing circuit by way of input terminal 21 of the summing circuit. This addition appears as a resultant wave 102 at the output terminal 22 of the summing circuit. For convenience, the original signal 100 is shown in dotted line along with the resultant wave 102. The resultant wave, emerging from terminal 22 of the summing circuit, is applied to the input terminal 40 of the switching stage 4. This stage has the property of developing a positive-going rectangular wave each time wave 102 crosses the reference axis in the positive direction, this rectangular wave maintaining a substantially constant amplitude until the succeeding negative-going excursion of wave 102 crosses the reference axis. At this instant, the switching stage generates a negative-going rectangular wave of constant amplitude which continues for the duration of time that wave 102 remains below its reference axis. The result is that the rectangular wave 103 is generated and appears at output terminal 41 of the switching stage 4. It is, therefore, evident that the positive excursion of the rectangular wave 103 exists for a period of time equal to that during which a corresponding part of wave 102 is positive and that the negative-going portion of wave 103 exists for a period of time that the corresponding part of wave 102 is negative. By reason of the fact that wave 102 is of triangular form, it is also true that the periods of time during which the positive and negative excursions of wave 103 exist are respectively proportional to the amplitudes of the corresponding positive and negative excursions of the resultant or combined wave 102. In this way the amplitude variable signal is effectively converted into a time variable signal so that the information contained in the original signal now appears in the time domain.

The amplitude of wave 103 coming from the switching stage 4 is considerably larger than will be desired so that its amplitude may be regulated by a control circuit 5 which is preferably of the balanced type. Wave 103 is applied to input terminal 50 of this balanced amplitude control circuit 5 where the ampiltude is regulated in accordance with a control current applied to terminal 51. Emerging from output terminal 52 of the control circuit 5 will then be a rectangular wave 104 having the same time intervals as the input wave 103 but now controlled to have a substantially constant amplitude A as illustrated in FIG. 1.

As previously indicated, the information contained in the original signal 100 has been converted from the amplitude domain to the time domain. To recover this information in the amplitude domain, an integrator 6 receives the wave 104 at its input terminal 60. The rectangular wave thus integrated emerges from output terminal 61 as wave 105. The smooth form of this wave would appear as wave 106 which, it will be noted, contains the same information as the original signal 100 but shifted in phase. It should here be noted that the amplitudes of the several waves shown in this figure are not to scale but are deliberately drawn out of scale for the purpose of more clearly illustrating the principles of the invention.

The integrated wave 105 is applied to the input terminal 70 of a linear amplifier 7 which, due to its pass characteristic, produces the smoothed wave 107 at its output terminal 71. Wave 107 is of the same form as the smoothed wave 106 and is delivered to the output circuit by way of output terminal 9.

A sample of the output signal 107 is applied to the level detector 8 at its input terminal 80. The level detector develops a control current proportional to the amplitude of wave 107 which emerges from its output terminal 81 and is applied to the control terminal 51 of the balanced amplitude control circuit 5. The output wave 107 is thus regulated in amplitude by controlling the amplitude A of wave 104. Should the output signal at terminal 9 change slightly, this change will immediately be reflected in the control current applied to terminal 51 which causes the balanced amplitude control circuit 5 to appropriately change the amplitude A to correct for the small change occurring at the output terminal 9.

Figures 2, 3:
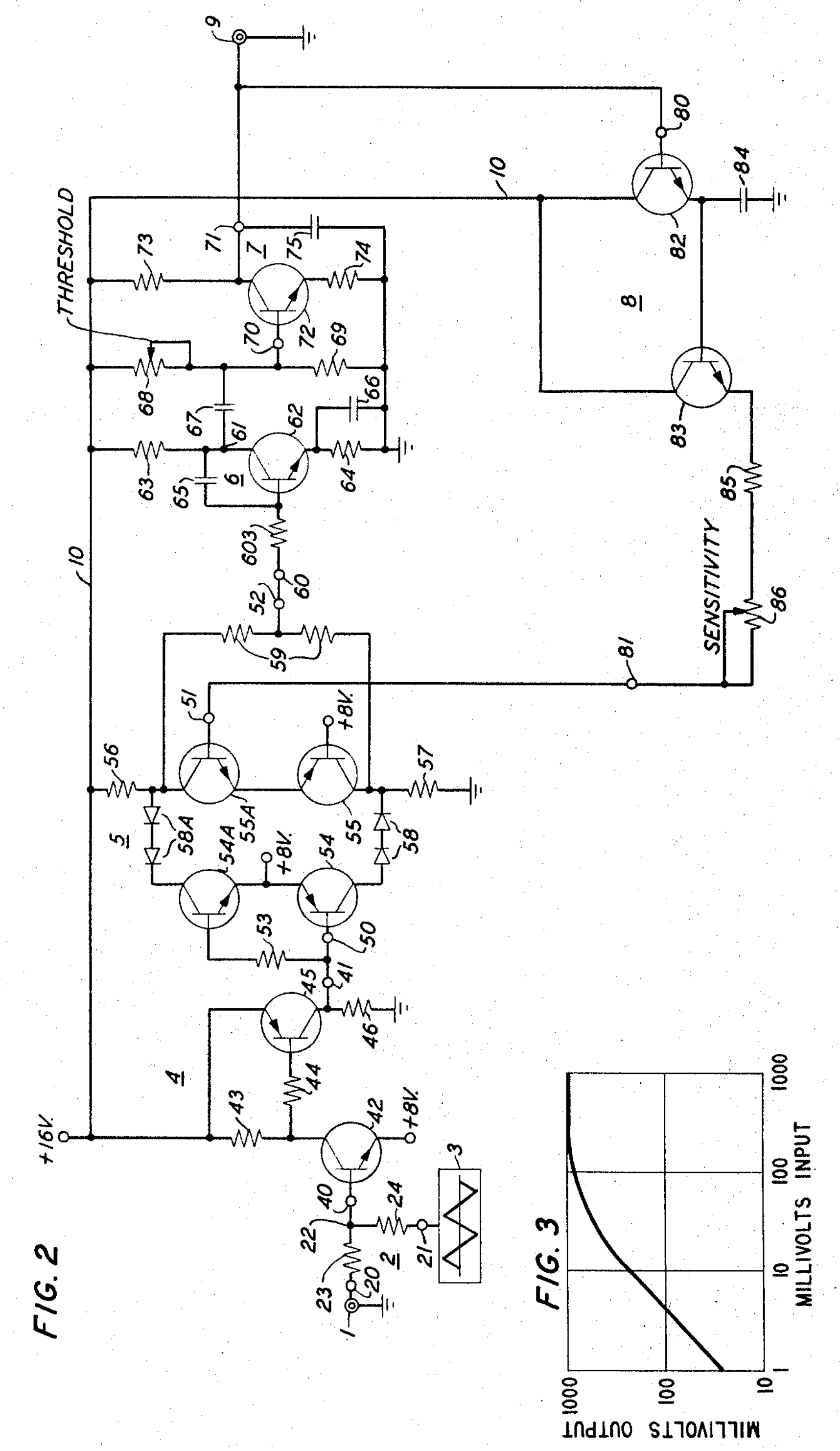
FIG. 3 is illustrative of the control characteristic of which the invention is capable.

FIG. 2 discloses a practical embodiment of this invention employing transistors as amplifying and switching devices. The summing circuit 2 comprises a pair of summing resistors 23 and 24 connected to the output terminal 22 of this network. The input signal from terminal 1 is applied to the signal input terminal 20 of resistor 23. The triangular wave generator 3 applies its output to the input terminal 21 of resistor 24 and, as is well known, the sum of these two input voltages appears at the output terminal 22. This combined or resultant wave is then applied to the input terminal 40 of the switching stage 4.

The switching stage comprises transistors 42 and 45. Transistor 42 operates as a simple switch such that as the resultant wave exceeds the emitter bias voltage transistor 42 is turned on and as it becomes less than this voltage, transistor 42 is turned off. The 8 volt positive potential applied to the emitter of the transistor provides the emitter bias. Input terminal 40 is connected to the base of transistor 42 and the collector is connected to the power supply bus 10 through resistor 43. The output from the collector of transistor 42 is connected to the base of amplifier transistor 45 by way of resistor 44. The emitter of transistor 45 is connected to the power supply bus 10 while the collector of transistor 45 is connected to ground through resistor 46. Output terminal 41 of the switching stage is connected to the collector of the amplifier transistor 45. As transistor 42 is alternately switched on and off by the resultant wave, the collector of transistor 45 alternately swings between two voltage levels to create a rectangular wave at output terminal 41. This wave corresponds wih wave 103 shown in FIG. 1.

The balanced amplitude control circuit 5 comprises four transistors 54, 54A, 55, 55A and two diode strings 58 and 58A. Transistors 54A and 55A are of the NPN type while transistors 54 and 55 are of the PNP type. Transistors 54 and 54A have their emitters connected together and to a positive 8 volt bias source. The two bases are connected together through a resistor 53. The collector of transistor 54A is connected to the power supply bus 10 through a resistor 56 and the diode string 58A, the latter being poled to conduct current in the positive direction toward the collector of transistor 54A. The collector of transistor 54 is connected to ground through a resistor 57 and diode string 58, the latter being poled to conduct positive current away from the collector of transistor 54. The emitters of transistors 55A and 55 are also connected together and the collector of transistor 55A is connected to the power supply bus 10 through resistor 56. The collector of transistor 55 is connected to ground through resistor 57. A pair of output resistors 59 are connected in series between the collectors of transistors 55 and 55A. The base of transistor 55 is connected to a positive 8 volt bias source. The base of transistor 55A is connected to the level control terminal 51. The junction between output resistors 59 is connected to the output terminal 52.

The operation of the balanced amplitude control circuit 5 may be described by considering first that the control terminal 51 is at a slightly lower potential than the base of transistor 55, thereby back-biasing the base-emitter junctions of both transistors 55 and 55A. During the positive-going phase of the rectangular wave at terminal 41, transistor 54A is turned ON while transistor 54 is turned OFF. The effect of this operation is to bring the collector of transistor 55A to approximately 8 volts. If output resistors 59 are equal, this will cause output terminal 52 to assume approximately one half this voltage or four volts with reference to ground. As the rectangular voltage at terminal 41 swings into its negative-going phase, transistor 54 is turned ON and transistor 54A is turned OFF, thereby bringing the collector of transistor 55 to 8 volts positive with respect to ground. This brings the output terminal 52 to approximately 12 volts above ground. Thus it will be seen under the conditions assumed, i.e., with transistors 55 and 55A back-biased a rectangular wave at terminal 41 causes output terminal 52 to switch plus or minus 4 volts around a reference voltage of approximately 8 volts. Under the assumed conditions, this would represent the maximum output of which the amplitude control circuit is capable. It is assumed, of course, that this voltage is higher than desired so that a control current supplied to terminal 51 in a manner to be subsequently described will cause transistors 55A and 55 to begin to conduct. This control current controls the impedance between the collectors of these two transistors which, in turn, controls the voltage appearing at output terminal 52. At a sufficiently strong control current, the collectors and terminals 52 will be held at the reference voltage so that no rectangular wave component is present. Intermediate control current values establish different rectangular wave amplitudes.

The regulated rectangular wave appearing at terminal 52 corresponds to the wave 104 having amplitude A as shown in FIG. 1. This wave is applied to the input terminal 60 of the integrator circuit 6 which, in this case, comprises transistor 62 and its associated circuitry. The base of this transistor is connected to input terminal 60 through a resistor 603 and the collector is connected to output terminal 61. A feedback capacitor 65 is connected between the collector and the base. Power supply is obtained from power supply bus 10 through collector resistor 63 and the emitter is grounded through a resistor 64 which is bypassed by capacitor 66. This circuit configuration will be recognized as being that of a conventional Miller integrator such as is described in Waveforms, Radiation Laboratory Series, vol. 19, page 650. As described therein, the rectangular input wave is integrated to produce the wave 105 shown in FIG. 1. This wave is applied to the base of transistor 72 by way of a capacitor 67.

Transistor 72 and its associated circuitry comprises the linear amplifier 7 shown in the block diagram of FIG. 1. The input terminal 70 of this amplifier is connected to the base of transistor 72 while its collector is connected to the output terminal 71. The collector is connected to power supply bus 10 by way of collector resistor 73 while the emitter is connected to ground by way of resistor 74. A potentiometer circuit for controlling the detector threshold level is made up of variable resistor 68 and fixed resistor 69 connected in series between power supply bus 10 and ground. The junction between these two elements is connected to the base of transistor 72. Adjustment of variable resistor 68 adjusts the voltage on the collector of transistor 72 and since this collector is directly connected to the base of level detector transistor 82 the threshold level at which the detector operates can be adjusted. Capacitor 75 connected between the collector of transistor 72 and ground acts as a filter capacitor to eliminate the high frequency component from the output circuit. The action of the integrator is, therefore, to reconvert the time variable signal to the original amplitude variable signal. The reconverted signal appears at the output terminal 9.

A sample of the output wave is taken from terminal 71 and applied to the input terminal 80 of the level detector 8. This level detector comprises transistors 82 and 83, transistor 82 acting as the detector unit and transistor 83 acting as an amplifier. The collectors of transistors 82 and 83 are connected to the power supply bus 10. The emitter of transistor 82 is connected to ground through the automatic gain control filter capacitor 84. The ungrounded end of capacitor 84 is connected to the base of amplifier transistor 83 so that the emitter current of transistor 83 is controlled by the potential appearing on capacitor 84. The potential appearing on capacitor 84 will be proportional to the peak amplitude of the reconverted output wave appearing at terminal 71. Consequently, the emitter current from transistor 83 will be propotrional to the peak amplitude appearing at terminal 71. This current is applied to the output terminal 81 and to the control terminal 51 by way of fixed resistor 85 and variable resistor 86, the latter acting as a sensitivity control. From the foregoing description it will be evident that a minute increase in the output level at terminal 9 can cause a corresponding increase in the current supplied to terminal 51 thereby causing a rapid decrease in the level applied to terminal 52. Stabilization is established around a condition of equilibrium so that only very small changes in output level can take place, the degree of such changes being determined by the loop gain of the automatic gain control circuit.

FIG. 3 discloses a typical characteristic of an amplifier having the automatic gain control circuit of this invention. Obviously, the threshold voltage and detector sensitivity can be varied over wide limits so that this characteristic is illustrative of only one operating condition. However, this figure illustrates a condition where very close regulation of the output voltage is maintained between an input voltage range of 100 to 1000 millivolts. In this range the output voltage is held at a substantially constant 1000 millivolts. Moreover, since level detector 8 is of the peak detector type, a small increase in peak voltage at terminal 9 causes capacitor 84 to assume a correspondingly higher voltage during only one cycle of the output voltage, thereby promptly regulating the gain in a very rapid fashion. This regulation changes more slowly on a reduction in output level but the rate can be increased by providing a resistive bypass, not shown, for capacitor 84. Ordinarily, however, the base current of transistor 83 is sufficient to provide this feature.

Figure 4:
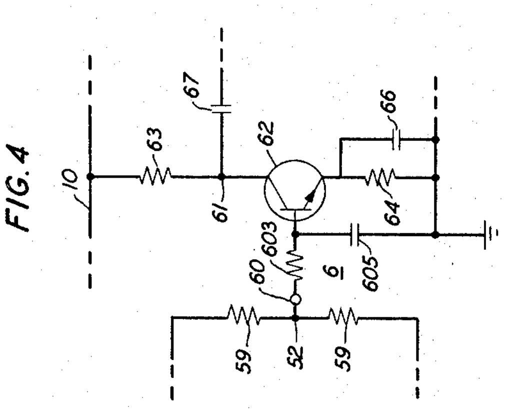

The invention is not restricted to the Miller type integrator shown in FIG. 2. FIG. 4 shows a modification of this portion of the circuit in which integration is accomplished by means of the output resistors 59, resistor 603 and a capacitor 605. In this case, transistor 62 acts as an ordinary amplifier, the feedback capacitor 65, shown in FIG. 2, having been eliminated. The resistive-capacitive integrator circuit shown here is of the type found in Waveforms, Radiation Laboratory Series, vol. 19, page 649. The rest of this fragmentary circuit is the same as shown in FIG. 2 and the relationship of this circuit to FIG. 2 is readily observed by comparing the reference numerals.

Figure 5:
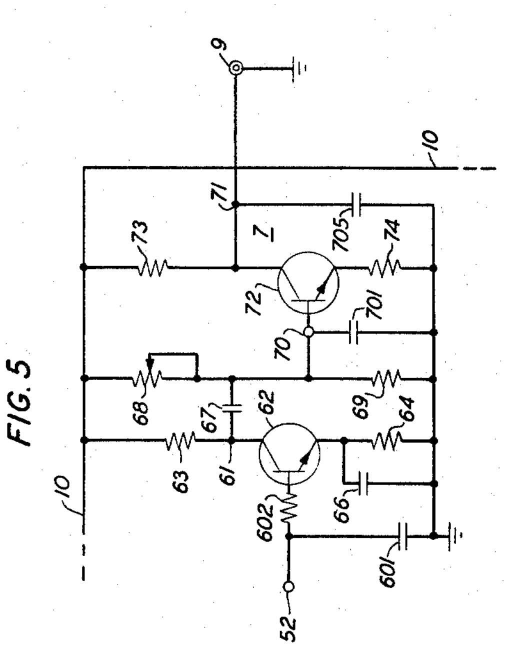
FIGS. 4 and 5 illustrate alternative integration circuits which may be used in the system disclosed in FIG. 2.

While the circuit of FIG. 4 will perform quite satisfactorily for many purposes, an improved version of this circuit embodying essentially the same principles is shown in FIG. 5. In this case, capacitor 601 has been connected between terminal 52 and ground to cooperate with the output resistors 59 of FIG. 2 to comprise one stage of a multistage integrator. An additional resistor 602 may be connected between terminal 52 and the base of transistor 62. Here again, the feedback capacitor 65 of FIG. 2 has been eliminated from the circuit of transistor 62 so that this transistor will act as an ordinary amplifier. Resistor 63 and capacitor 701 cooperate to provide a second stage of integration, the capacitor 701 being connected in series with resistor 63 between power supply bus 10 and ground by way of coupling capacitor 67. Capacitor 75 of FIG. 2 may be altered in size as represented by capacitor 705 in FIG. 5 and this capacitor in cooperation with the collector resistor 73 of amplifier 7 may constitute a third stage of integration. This circuit performs in essentially the same way as previously described for the circuit of FIG. 4. The remaining reference numerals in FIG. 5 correspond with those shown in FIG. 2.

Instead of thinking of the circuits of FIGS. 4 and 5 as integrator circuits they may be thought of as filter circuits so that other types of filter circuits having similar electrical characteristics may be substituted for the ones used herein for illustrative purposes.

Figure 6:
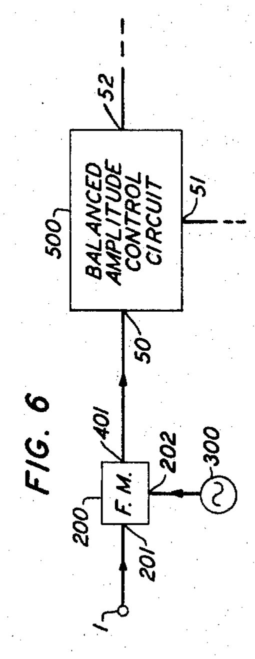
FIG. 6 illustrates an alternative means for converting the amplitude variable alternating current signal to a higher frequency time variable signal.

FIG. 6 shows another means for converting the amplitude variable signal applied to terminal 1 to a time variable signal having a higher frequency. In this case a high frequency oscillator 300 supplies a carrier frequency to input terminal 202 of a frequency modulator 200. The signal applied to terminal 1 is supplied to the signal input terminal 201 of the frequency modulator. This frequency modulator is of conventional configuration and at its output terminal 401 will appear a frequency modulated carrier having the time duration between successive cycles controlled by the amplitude of the signal so that these time durations contain the information of the input signal. When this frequency modulated wave is subsequently detected, the signal is recovered. It is well known that the amplitude of the recovered signal is also a function of the amplitude of the frequency modulated carrier so that conventional frequency modulated systems include a carrier amplitude stabilization means. Use is made of this property in the circuit of FIG. 6 in that the balanced amplitude control circuit 500 contains conventional circuitry capable of controlling the amplitude of the modulated carrier in accordance with a control current supplied at its control terminal 51. The output of this balanced amplitude control circuit appears at output terminal 52 and is converted to the original signal by conventional frequency modulation techniques. This reconverted signal is detected to supply the control current to terminal 51 in the same manner as indicated in FIG. 2.

While rather specific circuits, voltage ranges, etc., have been employed in illustrating this invention, it is quite evident to those skilled in the art that various modifications thereof may be employed to accomplish the same objectives in essentially the same way without departing from the scope of the invention.

What is claimed is:

1. An automatic gain control circuit for an alternating current amplifier comprising means for converting an amplitude variable alternating current signal to a higher frequency time variable signal, said means comprising a pulse width modulator which converts said signal to a wave of rectangular form, the time durations of the positive and negative excursions of which are determined by the instantaneous amplitude and polarity of said alternating current signal, means responsive to a control current for regulating the amplitude of the time variable signal, means for reconverting the time variable signal to an amplitude variable signal corresponding to the original amplitude variable alternating current signal, means deriving a control current proportional to the amplitude of said reconverted signal, and means for applying said derived control current to said means for regulating the amplitude of the time variable signal.

2. An automatic gain control circuit for an alternating current amplifier comprising means for converting an amplitude variable alternating current signal to a higher frequency time variable signal, said means comprising a source of triangular wave alternating current having a frequency substantially higher than that of said signal, a summing circuit for combining said triangular wave with said alternating current signal, and a switching circuit for receiving the combined wave and converting it to a time variable signal of rectangular wave form, the time durations of the positive and negative excursions of which are respectively proportional to the amplitudes of corresponding positive and negative excursions of said combined wave, means responsive to a control current for regulating the amplitude of the time variable signal, means for reconverting the time variable signal to an amplitude variable signal corresponding to the original amplitude variable alternating current signal, means deriving a control current proportional to the amplitude of said reconverted signal, and means for applying said derived control current to said means for regulating the amplitude of the time variable signal.

3. An automatic gain control circuit for an alternating current amplifier comprising means for converting an alternating current signal to a higher frequency rectangular wave, the relative widths of its positive-going and its negative-going excursions being determined by the instantaneous amplitude and phase of said signal, means for controlling the amplitude of said rectangular wave in response to the intensity of a direct current, means for reconverting said rectangular wave to an alternating current wave corresponding to said signal and having an amplitude determined by the amplitude of said rectangular wave, means for deriving a direct current of intensity proportional to the amplitude of said reconverted wave, and means applying said derived direct current to said means for controlling the amplitude of said rectangular wave to regulate the amplitudes of said rectangular and reconverted waves in accordance with the intensity of said direct current.

4. The combination of claim 3 wherein said means for converting an alternating current signal comprises a pulse width modulator.

5 The combination of claim 3 wherein said means for converting an alternating current signal comprises a source of triangular wave alternating current having a frequency substantially higher than that of said signal, a summing circuit for combining said triangular wave with said alternating current signal, and a switching circuit for receiving the combined wave and converting it to a time variable signal of rectangular wave form, the time durations of the positive and negative excursions of which are respectivley proportional to the amplitudes of corresponding positive and negative excursions of said combined wave.

6. The combination of claim 3 wherein the means for reconverting said rectangular wave comprises an integrating circuit.

7. The combination of claim 3 wherein the means for reconverting said rectangular wave comprises a transistor having a base, a collector and an emitter, and a capacitor connected between said collector and base to cause said transistor to operate as an integrator.

8. The combination of claim 3 wherein the means for reconverting said rectangular wave comprises a resistance means in series with a capacitance means proportioned to operate an integrator.

References Cited

UNITED STATES PATENTS

| | | | |
|---|---|---|---|
| 3,204,119 | 8/1965 | Gray | 307—88.5 |
| 3,214,704 | 10/1965 | Holzwarth | 330—10 |

FOREIGN PATENTS

| | | |
|---|---|---|
| 451,248 | 9/1948 | Canada. |

ROY LAKE, *Primary Examiner.*

J. B. MULLINS, *Assistant Examiner.*